United States Patent
Yang

(10) Patent No.: US 10,524,214 B2
(45) Date of Patent: Dec. 31, 2019

(54) POWER INFORMATION EXCHANGE METHOD AND DEVICE

(71) Applicant: HUAWEI TECHNOLOGIES CO., LTD., Shenzhen, Guangdong (CN)

(72) Inventor: Changqing Yang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 21 days.

(21) Appl. No.: 15/797,579

(22) Filed: Oct. 30, 2017

(65) Prior Publication Data
US 2018/0132196 A1 May 10, 2018

Related U.S. Application Data

(63) Continuation of application No. PCT/CN2015/078133, filed on Apr. 30, 2015.

(51) Int. Cl.
*H04W 52/34* (2009.01)
*H04W 24/02* (2009.01)
(Continued)

(52) U.S. Cl.
CPC ......... *H04W 52/343* (2013.01); *H04B 17/24* (2015.01); *H04W 24/02* (2013.01); *H04W 24/10* (2013.01); *H04W 52/34* (2013.01)

(58) Field of Classification Search
CPC ... H04W 24/02; H04W 24/10; H04W 52/343; H04W 52/34
(Continued)

(56) References Cited

U.S. PATENT DOCUMENTS

| 8,842,599 B2 | 9/2014 | Osseiran et al. |
| 8,934,905 B2 | 1/2015 | Cho et al. |

(Continued)

FOREIGN PATENT DOCUMENTS

| CN | 101431793 A | 5/2009 |
| CN | 101719801 A | 6/2010 |

(Continued)

OTHER PUBLICATIONS

International Search Report dated Feb. 1, 2016 in corresponding International Patent Application No. PCT/CN2015/078133.
(Continued)

*Primary Examiner* — John J Lee
(74) *Attorney, Agent, or Firm* — Kilpatrick Townsend & Stockton LLP

(57) ABSTRACT

The present invention provides a power information exchange method and a device, and relates to the communications field, so as to exchange actual power of a device, effectively reduce network power consumption, and improve network energy efficiency performance. The method includes: sending, by a first device, a power information request message to each second device, where the second device is a device connected to the first device, and the power information request message is used to instruct each second device to measure actual power of the second device; and receiving, by the first device, a power information reply message sent by each second device, where the power information reply message carries the actual power of the second device sending the power information reply message, and the power information request message carries type information of the actual power and format information of the actual power.

18 Claims, 7 Drawing Sheets

(51) Int. Cl.
*H04B 17/24* (2015.01)
*H04W 24/10* (2009.01)

(58) Field of Classification Search
USPC ......... 455/522, 69, 67.11, 509, 452.1, 452.2, 455/41.2
See application file for complete search history.

(56) References Cited

U.S. PATENT DOCUMENTS

| | | | |
|---|---|---|---|
| 2008/0013225 A1 | 1/2008 | Hung | |
| 2008/0132225 A1 | 6/2008 | Ranta et al. | |
| 2009/0003585 A1* | 1/2009 | Chen | H04M 3/20 379/268 |
| 2010/0238879 A1* | 9/2010 | Jeon | H04W 52/08 370/329 |
| 2010/0273432 A1 | 10/2010 | Meshkati et al. | |
| 2011/0044284 A1 | 2/2011 | Voltolina et al. | |
| 2012/0231748 A1 | 9/2012 | Liu et al. | |
| 2013/0090147 A1 | 4/2013 | Yamazaki | |
| 2013/0137446 A1 | 5/2013 | Narlikar et al. | |
| 2013/0252612 A1 | 9/2013 | Morimoto et al. | |
| 2014/0111183 A1 | 4/2014 | Jun et al. | |
| 2015/0031284 A1 | 1/2015 | Pitakdumrongkija et al. | |
| 2015/0156714 A1 | 6/2015 | Xia | |
| 2016/0286499 A1* | 9/2016 | Lim | H04W 52/243 |

FOREIGN PATENT DOCUMENTS

| | | |
|---|---|---|
| CN | 102405675 A | 4/2012 |
| CN | 103037491 A | 4/2013 |
| CN | 103262615 A | 8/2013 |
| CN | 103906153 A | 7/2014 |
| CN | 104023346 A | 9/2014 |
| JP | 2012195752 A | 10/2012 |
| JP | 2013502820 A | 1/2013 |
| JP | 2013026823 A | 2/2013 |
| WO | 2011158858 A1 | 12/2011 |
| WO | 2014/022960 A1 | 2/2014 |

OTHER PUBLICATIONS

International Search Report dated Feb. 1, 2016 in corresponding International Patent Application No. PCT/CN2015/078133, 8 pp.
Written Opinion of the International Search Authority dated Feb. 2, 2016 in corresponding International Patent Application No. PCT/CN2015/078133, 4 pp.
3GPP, "3rd Generation Partnership Project; Technical Specification Group Radio Access Network; Evolved Universal Terrestrial Radio Access (E-UTRA); Physical layer procedures (Release 12)", Mar. 2015, 239 pp.
3GPP, "3rd Generation Partnership Project; Technical Specification Group Radio Access Network; Evolved Universal Terrestrial Radio Access Network (E-UTRAN); X2 application protocol (X2AP) (Release 12)", Mar. 2015, 208 pp.
Notice of Reasons for Rejection, dated Dec. 10, 2018, in Japanese Application No. 2017556925 (23 pp.).
Extended European Search Report dated Apr. 23, 2018, in corresponding European Patent Application No. 15890355.9, 10 pgs.
Chinese Office Action dated Apr. 19, 2019 in corresponding Chinese Patent Application No. 201580071804.3 (12 pages).
European Office Action dated Mar. 11, 2019 in corresponding European Patent Application No. 15890355.9 (7 pages).
Notice of Allowance, dated Mar. 11, 2019, in Japanese Application No. 2017556925 (3 pp.).

* cited by examiner

POWER INFORMATION EXCHANGE METHOD AND DEVICE

CROSS-REFERENCE TO RELATED APPLICATIONS

This application is a continuation of International Application No. PCT/CN2015/078133, filed on Apr. 30, 2015, the disclosure of which is hereby incorporated by reference in its entirety.

TECHNICAL FIELD

The present invention relates to the communications field, and in particular, to a power information exchange method and a device.

BACKGROUND

In a Long Term Evolution (LTE) system, load information can be transferred between different base stations by using an X2 interface. The load information may include relative narrowband Tx power (RNTP) information, almost blank subframe (ABS) information, and the like. The RNTP information can indicate transmit power levels of a base station on different bandwidths, the ABS information can reflect transmit power levels of a base station in different time periods, and the RNTP information and the ABS information cannot represent power actually consumed by a base station. However, in the prior art, there is no solution in which actually consumed power of a base station can be exchanged. Therefore, network optimization cannot be performed based on the actually consumed power of the base station.

SUMMARY

Embodiments of the present invention provide a power information exchange method and a device, so as to exchange actual power of a device.

To achieve the foregoing objective, the following technical solutions are used in the embodiments of the present invention.

According to a first aspect, a power information exchange method is provided, including:
  separately sending, by a first device, a power information request message to each second device, where the second device is a device connected to the first device, and the power information request message is used to instruct each second device to measure actual power of the second device; and
  receiving, by the first device, a power information reply message sent by each second device, where the power information reply message carries the actual power of the second device sending the power information reply message, and
  the power request message carries type information of the actual power and format information of the actual power.

With reference to the first aspect, in a first possible implementation of the first aspect,
  the power request information further includes device information of the first device and device information of the second device.

With reference to the first aspect or the first possible implementation of the first aspect, in a second possible implementation of the first aspect,
  the actual power is a sum of power consumed by all components required by the second device to work, and the method further includes: obtaining, by the first device, an update access threshold of the second device by means of calculation according to the actual power that is carried in the power information reply message sent by the second device; and
  sending the update access threshold to the second device, so that the second device sets an access device of the second device to be in compliance with the update access threshold.

With reference to the first aspect or the first possible implementation of the first aspect, in a third possible implementation of the first aspect.
  the actual power is a sum of power consumed by all components required by the second device to work, and if the power information request message is used to instruct the second device to send the first device a parameter required for determining the actual power of the second device, the method further includes:
  periodically sending, by the first device, the power information request message to the second device;
  periodically receiving, by the first device, the power information reply message sent by the second device, where the power information reply message carries the parameter required for determining the actual power of the second device; and
  obtaining, by the first device, the actual power of the second device by means of calculation according to the parameter that is required for determining the actual power of the second device and that is carried in the received power information reply message.

With reference to the first aspect or the first possible implementation of the first aspect, in a fourth possible implementation of the first aspect,
  the actual power is a sum of power consumed by all components required by the second device to work, and the method further includes: transferring, by the first device, load of a second device whose actual power is greater than a preset value onto a second device whose actual power is less than the preset value.

With reference to the first aspect or the first possible implementation of the first aspect, in a fifth possible implementation of the first aspect,
  if the actual power is sending power and receive power, the method further includes:
  obtaining, by the first device, transmit power between the first device and each second device by means of calculation according to a receive power value and a sending power value of each second device;
  determining transmission energy efficiency between the first device and each second device according to the transmit power between the first device and each second device; and
  using, by the first device, a second device as a backhaul node for transmitting a resource to a user terminal, where the transmission energy efficiency between the second device and the first device is largest.

With reference to the fifth possible implementation of the first aspect, in a sixth possible implementation of the first aspect,
  the obtaining, by the first device, transmit power between the first device and each second device by means of calculation according to a receive power value and a sending power value of each second device specifically includes:

a. obtaining, by the first device, a sending power value of the first device by means of measurement, and using a sum of the sending power value of the first device, the sending power value of the second device, and the receive power value of the second device as transmit power between the second device and the first device; and b. performing the foregoing step a on each second device, to obtain the transmit power between the first device and each second device.

With reference to the first aspect or the first possible implementation of the first aspect, in a seventh possible implementation of the first aspect, the actual power is a sum of power consumed by all components required by the second device to work, and the method further includes: configuring, by the first device, a radio resource for the second device according to the actual power of the second device, and sending a radio resource configuration message to instruct the second device to transmit data on the corresponding radio resource.

According to a second aspect, a power information exchange method is disclosed, including:

receiving, by a second device, a power information request message sent by a first device, where the second device is a device connected to the first device, and the power information request message is used to instruct the second device to measure actual power of the second device;

measuring, by the second device, the actual power of the second device; and sending, by the second device, a power information reply message to the first device, where the power information reply message carries the actual power of the second device.

With reference to the second aspect, in a first possible implementation of the second aspect, the power request information includes type information of the actual power, format information of the actual power, device information of the second device, and device information of the first device.

With reference to the second aspect or the first possible implementation of the second aspect, in a second possible implementation of the second aspect, the actual power is receive power and sending power, or the actual power is a sum of power consumed by all components required by the second device to work.

With reference to the second aspect or the first possible implementation of the second aspect, in a third possible implementation of the second aspect, if the power information request message is used to instruct the second device to send the first device a parameter required for determining the actual power of the second device, the method further includes:

periodically receiving, by the second device, the power information request message sent by the first device; and periodically sending, by the second device, the power information reply message to the first device, where the power information reply message carries the parameter required for determining the actual power of the second device.

According to a third aspect, a first device is disclosed, including:

an information sending unit, configured to separately send a power information request message to each second device, where the second device is a device connected to the first device, and the power information request message is used to instruct each second device to measure actual power of the second device; and an information receiving unit, configured to receive a power information reply message sent by each second device, where the power information reply message carries the actual power of the second device sending the power information reply message, and the power request message carries type information of the actual power and format information of the actual power.

With reference to the third aspect, in a first possible implementation of the third aspect, the power request information further includes device information of the first device and device information of the second device.

With reference to the third aspect or the first possible implementation of the third aspect, in a second possible implementation of the third aspect, the actual power is a sum of power consumed by all components required by the second device to work, and the first device further includes a calculation unit, where the calculation unit is configured to obtain an update access threshold of the second device by means of calculation according to the actual power that is carried in the power information reply message sent by the second device; and the information sending unit is further configured to send the update access threshold to the second device, so that the second device sets an access device of the second device to be in compliance with the update access threshold.

With reference to the third aspect or the first possible implementation of the third aspect, in a third possible implementation of the third aspect, the actual power is a sum of power consumed by all components required by the second device to work, and if the power information request message is used to instruct the second device to send the first device a parameter required for determining the actual power of the second device, the information sending unit is further configured to periodically send the power information request message to the second device;

the information receiving unit is further configured to periodically receive the power information reply message sent by the second device, where the power information reply message carries the parameter required for determining the actual power of the second device; and the calculation unit is configured to obtain the actual power of the second device by means of calculation according to the parameter that is required for determining the actual power of the second device and that is carried in the received power information reply message.

With reference to the third aspect or the first possible implementation of the third aspect, in a fourth possible implementation of the third aspect, the actual power is a sum of power consumed by all components required by the second device to work, the first device further includes a load control unit, and the load control unit is configured to transfer load of a second device whose actual power is greater than a preset value onto a second device whose actual power is less than the preset value.

With reference to the third aspect or the first possible implementation of the third aspect, in a fifth possible implementation of the third aspect, if the actual power is sending power and receive power, the first device further includes a determining unit; and the calculation unit is further configured to obtain transmit power between the first device and each second device by means of calculation according to a receive power value and a sending power value of each second device;

the calculation unit is further configured to determine transmission energy efficiency between the first device and each second device according to the transmit power between the first device and each second device; and the determining unit is configured to use a second device as a backhaul node for transmitting a resource to a user terminal, where the transmission energy efficiency between the second device and the first device is largest.

With reference to the fifth possible implementation of the third aspect, in a sixth possible implementation of the third aspect, the first device further includes a measurement unit, where the measurement unit is configured to obtain a sending power value of the first device by means of measurement;

the calculation unit is specifically configured to use a sum of the sending power value of the first device, the sending power value of the second device, and the receive power value of the second device as transmit power between the second device and the first device; and the calculation unit is further configured to repeatedly perform the "using a sum of the sending power value of the first device, the sending power value of the second device, and the receive power value of the second device as transmit power between the second device and the first device", to obtain the transmit power between the first device and each second device.

With reference to the third aspect or the first possible implementation of the third aspect, in a seventh possible implementation of the third aspect, the actual power is a sum of power consumed by all components required by the second device to work, the first device further includes a configuration unit, and the configuration unit is configured to: configure a radio resource for the second device according to the actual power of the second device, and send a radio resource configuration message to instruct the second device to transmit data on the corresponding radio resource.

According to a fourth aspect, a second device is disclosed, where the second device is a device connected to the first device, and includes:

an information receiving unit, configured to receive a power information request message sent by the first device, where the power information request message is used to instruct the second device to measure actual power of the second device;

a measurement unit, configured to measure the actual power of the second device; and an information sending unit, configured to send a power information reply message to the first device, where the power information reply message carries the actual power of the second device.

With reference to the fourth aspect, in a first possible implementation of the fourth aspect, the power request information includes type information of the actual power, format information of the actual power, device information of the second device, and device information of the first device.

With reference to the fourth aspect or the first possible implementation of the fourth aspect, in a second possible implementation of the fourth aspect, the actual power is receive power and sending power, or the actual power is a sum of power consumed by all components required by the second device to work.

With reference to the fourth aspect or the first possible implementation of the fourth aspect, in a third possible implementation of the fourth aspect, if the power information request message is used to instruct the second device to send the first device a parameter required for determining the actual power of the second device, the information receiving unit is further configured to periodically receive the power information request message sent by the first device; and the information sending unit is further configured to periodically send the power information reply message to the first device, where the power information reply message carries the parameter required for determining the actual power of the second device.

According to a fifth aspect, a first device is disclosed, including:

a processor, configured to separately send a power information request message to each second device by using a communications interface, where the second device is a device connected to the first device, and the power information request message is used to instruct each second device to measure actual power of the second device; and the processor is further configured to receive, by using the communications interface, a power information reply message sent by each second device, where the power information reply message carries the actual power of the second device sending the power information reply message, and the power request message carries type information of the actual power and format information of the actual power.

With reference to the fifth aspect, in a first possible implementation of the fifth aspect, the power request information further includes device information of the first device and device information of the second device.

With reference to the fifth aspect or the first possible implementation of the fifth aspect, in a second possible implementation of the fifth aspect, the actual power is a sum of power consumed by all components required by the second device to work, and the processor is configured to obtain an update access threshold of the second device by means of calculation according to the actual power that is carried in the power information reply message sent by the second device; and the processor is further configured to send the update access threshold to the second device by using the communications interface, so that the second device sets an access device of the second device to be in compliance with the update access threshold.

With reference to the fifth aspect or the first possible implementation of the fifth aspect, in a third possible implementation of the fifth aspect, the actual power is a sum of power consumed by all components required by the second device to work, and if the power information request message is used to instruct the second device to send the first device a parameter required for determining the actual power of the second device, the processor is further configured to periodically send the power information request message to the second device by using the communications interface;

the processor is further configured to periodically receive, by using the communications interface, the power information reply message sent by the second device, where the power information reply message carries the parameter required for determining the actual power of the second device; and the processor is configured to obtain the actual power of the second device by means of calculation according to the parameter that is required for determining the actual power of the second device and that is carried in the received power information reply message.

With reference to the fifth aspect or the first possible implementation of the fifth aspect, in a fourth possible implementation of the fifth aspect, the actual power is a sum of power consumed by all components required by the second device to work, and the processor is configured to transfer load of a second device whose actual power is greater than a preset value onto a second device whose actual power is less than the preset value.

With reference to the fifth aspect or the first possible implementation of the fifth aspect, in a fifth possible implementation of the fifth aspect, if the actual power is sending power and receive power, the processor is further configured to: obtain transmit power between the first device and each second device by means of calculation according to a receive power value and a sending power value of each second device; determine transmission energy efficiency between the first device and each second device according to the transmit power between the first device and each second device; and use a second device as a backhaul node for transmitting a resource to a user terminal, where the transmission energy efficiency between the second device and the first device is largest.

With reference to the fifth possible implementation of the fifth aspect, in a sixth possible implementation of the fifth aspect, the processor is configured to: obtain a sending power value of the first device by means of measurement; use a sum of the sending power value of the first device, the sending power value of the second device, and the receive power value of the second device as transmit power between the second device and the first device; and repeatedly perform the "using a sum of the sending power value of the first device, the sending power value of the second device, and the receive power value of the second device as transmit power between the second device and the first device", to obtain the transmit power between the first device and each second device.

With reference to the fifth aspect or the first possible implementation of the fifth aspect, in a seventh possible implementation of the fifth aspect, the actual power is a sum of power consumed by all components required by the second device to work, and the processor is configured to: configure a radio resource for the second device according to the actual power of the second device, and send a radio resource configuration message to instruct the second device to transmit data on the corresponding radio resource.

According to a sixth aspect, a second device is disclosed, where the second device is a device connected to the first device, and includes:

a processor, configured to receive, by using a communications interface, a power information request message sent by the first device, where the power information request message is used to instruct the second device to measure actual power of the second device;

the processor is further configured to measure the actual power of the second device; and the processor is further configured to send a power information reply message to the first device by using the communications interface, where the power information reply message carries the actual power of the second device.

With reference to the sixth aspect, in a first possible implementation of the sixth aspect, the power request information includes type information of the actual power, format information of the actual power, device information of the second device, and device information of the first device.

With reference to the sixth aspect or the first possible implementation of the sixth aspect, in a second possible implementation of the sixth aspect, the actual power is receive power and sending power, or the actual power is a sum of power consumed by all components required by the second device to work.

With reference to the sixth aspect or the first possible implementation of the sixth aspect, in a third possible implementation of the sixth aspect, if the power information request message is used to instruct the second device to send the first device a parameter required for determining the actual power of the second device, the processor is further configured to: periodically receive, by using the communications interface, the power information request message sent by the first device, and periodically send the power information reply message to the first device by using the communications interface, where the power information reply message carries the parameter required for determining the actual power of the second device.

According to the power information exchange method and the device provided in the present invention, a first device sends a power information request message to a second device, to instruct the second device to measure actual power. The first device receives a power information reply message sent by each second device, to obtain actual power that is of each second device and that is carried in each power information reply message. In the prior art, power information exchange may be performed between the first device and the second device. However, power information cannot represent actual power of a base station, and therefore, the device cannot perform network optimization based on the power information, and network power consumption cannot be effectively reduced. According to the power information exchange method and the device provided in this application, actual power of a device can be exchanged, so that the first device can obtain the actual power of the second device connected to the first device, and the first device can update current configuration based on the actual power of each second device, thereby improving network energy efficiency performance.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

Figure 1:
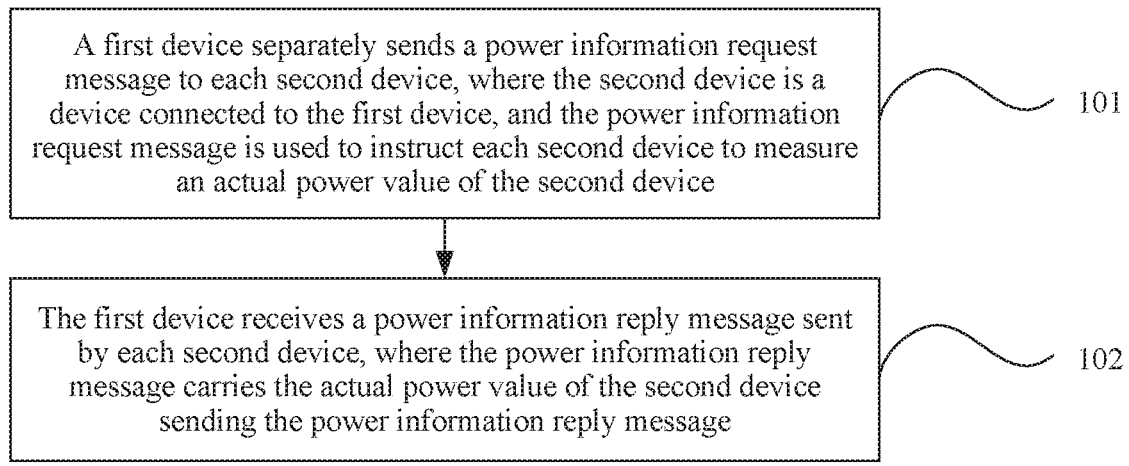
FIG. 1 is a schematic flowchart of a power information exchange method according to Embodiment 1 of the present invention.

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Existing three technologies of dense networking, large-scale antenna, and high bandwidth communications largely increase network power consumption (power consumption for short). For example, the dense networking requires more base stations to be deployed, the large-scale antenna technology brings more complex components and signal processing, and the high bandwidth communications technology requires an increase of radiated power to ensure coverage performance on unit bandwidth. All these increase the network power consumption.

In addition, the network power consumption is becoming a global problem. From a perspective of network operation, power consumption costs used by an operator for the network operation have been a main part of overall operation costs, account for even more than 40%, and become a bottleneck for the operator to control costs and increase profits. Therefore, the power consumption is an unavoidable issue for ensuring that a mobile communications system can sustainably develop. How to use power more effectively so that a network can achieve a quite high transmission capability with a relatively low power level is an important problem needing to be considered during system design.

In an LTE system, load information can be transferred between different base stations by using an X2 interface. The load information includes relative narrowband Tx power information (RNTP information), ABS information, and the like. The RNTP information can indicate transmit power levels of a base station on different bandwidths, and the ABS information can reflect transmit power levels of a base station in different time periods. Therefore, with reference to the RNTP information and the ABS information, a transmit power behavior of a base station can be determined. However, the base station cannot use the information to optimize network energy efficiency. A main reason is that the RNTP and the ABS of the base station can indicate only a radiated power feature of the base station. Actually, some components (such as a power supply and a fan) inside the base station also cause power consumption, and therefore, there is a quite large difference between actually consumed power of the base station and the RNTP information and the ABS information. Consequently, the transmit power information cannot represent the actual power of the base station. For example, radiated power of a typical macro base station is generally 46 dBm (approximately 40 W) whereas corresponding actually consumed power of the macro base station is hundreds of watts, and there is a quite large difference between the two. Therefore, network optimization based on the RNTP and the ABS cannot improve network energy efficiency performance.

This application is intended to optimize network performance according to actual power of a base station by means of actual power exchange between base stations.

Embodiment 1

This embodiment of the present invention provides a power information exchange method executed by a first device. As shown in FIG. 1, the method includes the following steps.

101. A first device separately sends a power information request message to each second device, where the second device is a device connected to the first device, and the power information request message is used to instruct each second device to measure actual power of the second device.

The first device may be a base station (BS) (including a macro base station and a micro base station), an access point (AP), remote radio equipment (RRE), a remote radio head (RRH), a remote radio unit (RRU), a relay node, and the like. A relationship between the first device and a cell is not limited, that is, one first device may be corresponding to one or more cells, or one cell may be corresponding to one or more first devices. In an embodiment of the present invention, if the first device is a macro base station, the second device is a micro base station. Alternatively, if the first device is a base station (a macro base station or a micro base station), the second device is user equipment connected to the base station. The user equipment may be a mobile phone, a tablet computer, a notebook computer, a personal computer, or the like. Actually, the first device herein is a device needing to obtain actual power information of another device so as to perform transmission control. The actual power is a sum of power consumed by all components required by the second device to maintain normal working, and the components required by the second device to maintain normal working include an air conditioner, an antenna, and the like. Alternatively, the actual power may be transmit power and receive power of the second device.

It should be noted that the power request information includes type information of the actual power, format information of the actual power, device information of the first device, and device information of the second device.

Each element included in the power request information is specifically described in the following.

1. The type information of the actual power: A type indicated by the type information may be power of the second device in different statuses (such as sending power, receive power, or sleep mode power), or may be power of the second device in different statistics manners (such as instantaneous power or average power), or may also be power efficiency information of the second device (such as an amount of data supported by unit energy, a quantity of connections supported by unit energy, and a quantity of users supported by unit energy).

2. The format information of the actual power: A format indicated by the format information may be quantized according to different value standards (such as absolute quantization or relative quantization), or may be quantized according to different models. If the format indicated by the format information is quantized according to different value standards, that the second device reports the actual power may specifically include: The first device and the second device pre-store a power value entry, and the power value entry includes several discrete power values (such as 1, 2, 3, and 4). When the format indicated by the power request information sent by the first device is quantized according to different value standards, if the actual power measured by the second device is 2.6, the second device queries the power value entry, and uses 3 that is in the entry and that is closest to 2.6 as the actual power of the second device and reports 3 to the first device.

If the format indicated by the format information is quantized according to different models, that the second device reports the actual power may specifically include: The second device receives the power request information sent by the first device, where the power request message carries identifier information of the model, and the second device reports, to the first device, a parameter required for determining the actual power of the second device according to the model.

3. The device information of the first device is device information of a device initiating a request, or it may be understood that the device information of the first device is device information of a device needing to obtain actual power.

102. The first device receives a power information reply message sent by each second device, where the power information reply message carries the actual power of the second device sending the power information reply message.

The power reply message is the actual power obtained by the second device by means of measurement after receiving the power information request message sent by the first device. The power information reply message carrying the actual power of the second device is then sent to the first device.

It should be noted that the power information reply message includes a power parameter, the device information of the first device, device information of the second device sending the power information reply message, and the like, and is used to indicate specific power information of the second device.

Specifically, according to content of the power information request message, the power parameter included in the power information reply message may be a power level of the second device, a quantized device power parameter of the second device, or a power parameter of the second device obtained in different quantization manners.

In addition, the first device is a device needing to obtain actual power information of the second device.

Further, in a preferred embodiment of the present invention, after steps 101 to 102, the first device updates current configuration according to the actual power that is carried in the power information reply message sent by each second device.

In a specific implementation, there may be several implementations for updating the current configuration by the first device according to the actual power carried in the power information sent by each second device.

1. The first device obtains an update access threshold of the second device by means of calculation according to the actual power that is carried in the power information reply message sent by the second device, and sends the update access threshold to the second device, so that the second device sets an access device of the second device to be in compliance with the update access threshold.

In the first implementation, the first device may be a macro base station, the second device may be a micro base station, and the access threshold may be a power value. When excessive users are connected to the macro base station, but fewer users are connected to the micro base station, the macro base station is excessively loaded whereas the micro base station is less loaded, and consequently, an overall network power level is relatively high. In this case, an access threshold of the micro base station may be reset, so that some users previously connected to the macro base station are connected to the micro base station. For example, the access threshold previously set for the micro base station is relatively high, and consequently, some users cannot access the micro base station. However, power actually consumed by the micro base station is relatively low, and the micro base station can load more users. In this case, the access threshold of the micro base station may be lowered, so that some users can be connected to the micro base station. Certainly, the macro base station may reset the access threshold of the micro base station according to actual power of one or more micro base stations, so that some users previously connected to the macro base station are transferred to the micro base station.

For example, after the micro base station is powered on the macro base station sends a power information request message to the micro base station, so as to obtain actual power of the micro base station (such as average power information of the micro base station within a recent time period). The micro base station performs measurement and data processing on power information of the micro base station according to the power information request message sent by the macro base station, to obtain the actual power, then constructs a power information reply message, adds the actual power to the power information reply message, and sends the power information reply message to the macro base station. The macro base station receives a power information reply message sent by each micro base station, and obtains the actual power of the micro base station according to information carried in the power information reply message, to set an access threshold of one or more micro base stations.

In this way, a load level of the macro base station may be obviously lowered, so that an overall network power level is lowered. Although some users are connected to the micro base station, the micro base station may maintain a relatively good service level by using more radio resources. This increases a load level of the micro base station, but an actual power level of the micro base station is quite low. Therefore, an increase of the load level brings only a quite limited increase of network power, and on the whole, a network energy efficiency level is obviously improved.

2. If the power information request message is used to instruct the second device to send the first device a parameter required for determining the actual power of the second device, the method further includes: periodically sending, by the first device, the power information request message to the second device; periodically receiving the power information reply message sent by the second device, where the power information reply message carries the parameter required for determining the actual power of the second device; obtaining, by the first device, the actual power of the second device by means of calculation according to the parameter that is required for determining the actual power of the second device and that is carried in the received power information reply message; and updating, by the first device, current configuration according to the actual power of the second device obtained by means of calculation.

The updating, by the first device, current configuration according to the actual power of the second device obtained by means of calculation specifically includes: transferring, by the first device, load of a second device whose actual power is greater than a preset value onto a second device whose actual power is less than the preset value.

In the second implementation, the first device may be a macro base station, and the second device may be a micro base station. For example, at a network operation stage, the macro base station may periodically send a power information request message to the micro base station, to control the micro base station to measure and report actual power, and obtain the actual power of the micro base station by using a power information reply message. The macro base station may obtain actual power of all micro base stations within a service range of the macro base station by means of information exchange, so as to perform control on load of different cells by using the actual power of each micro base station. For example, when finding that actual power of a micro base station is relatively high, the macro base station may consider to lower a load level of the micro base station, and unload some services to another adjacent micro base station whose actual power is relatively low. This can effectively lower an overall network power level.

It should be noted that although actual power of a base station is related to load, different base stations have different correspondences between actual power and load. Therefore, a relationship between actual power of a base station and a load level (including bandwidth load and power load) needs to be established. A method is modeling actual power of a base station. For example, $P=f(\lambda_B,\lambda_P)$, where P indicates the actual power of the base station, $f(\cdot)$ indicates a function, $\lambda_B$ indicates bandwidth load of the base station (defined as a bandwidth resource actually used by the base station divided by a bandwidth resource that the base station can use), and $\lambda_P$ indicates power load of the base station (defined as actual radiated power of the base station divided by maximum radiated power of the base station). The macro base station needs to indicate, in the power information request message, a model used by the micro base station to quantize the actual power (may indicate information about a model), that is, instruct the micro base station to send the macro base station a parameter required for determining the actual power of the micro base station. The micro base station adds corresponding model parameters (that is, several parameters used for obtaining the actual power of the micro base station by means of calculation) to the power information reply message. For example, the actual power of the base station may be modeled as a load-related linear function, that is, $P=k_B\lambda_B+k_P\lambda_P+P_0$. In this way, the micro base station adds a parameter such as $k_B$, $k_P$, and $P_0$ to a replied power information reply message, and then, the macro base station periodically sends the power information request message to the micro base station, to trigger the micro base station to transfer $\lambda_B$ and $\lambda_P$ to the macro base station.

Both the macro base station and the micro base station know a specific form of a model, and the actual power can be obtained provided that a parameter of the model is determined. Therefore, when a base station needs to obtain actual power of another base station, a target base station (that is, the foregoing another base station) needs to feed back a key parameter of the target base station, such as a load level. By receiving the power information reply message, the macro base station can know a current power level and a power consumption behavior of the micro base station, thereby adjusting load levels of different base stations by means of load control, so as to reduce network power and improve network energy efficiency while ensuring a service.

3. In the third implementation, the actual power is a sending power value and a receive power value. The first device may be a macro base station, and the second device may be a micro base station. The first device obtains, by means of calculation according to the receive power value and the sending power value of each second device connected to the first device, transmit power between the first device and each second device connected to the first device; and the first device uses a second device connected to the first device as a backhaul node, where the transmit power between the second device and the first device is largest. Specifically, the following steps are included: a. The first device obtains a sending power value of the first device by means of measurement, and uses a sum of the sending power value of the first device, the sending power value of the second device connected to the first device, and the receive power value of the second device as transmit power between the second device and the first device; and b. performing the foregoing step a on each second device connected to the first device, to obtain the transmit power between the first device and each second device connected to the first device.

For example, when a user is connected to a micro base station for accessing a network resource, and the micro base station is not connected to a core network, the micro base station sends a request to a surrounding macro base station, the macro base station accesses the core network to obtain the resource needed by the user, and sends the resource needed by the user to the micro base station (a first hop), and then the micro base station backhauls the resource to user equipment (a second hop). Network energy efficiency may be improved if the macro base station selects and uses a micro base station as a backhaul node for transmitting the resource to the user equipment, where transmission energy efficiency between the micro base station and the macro base station is relatively good.

Specifically, the macro base station sends the power information request message to the micro base station, to instruct the micro base station to measure the sending power value and the receive power value, and then the micro base station reports the sending power value and the receive power value of the micro base station by using the power information reply message. The macro base station can obtain a sending power value of the macro base station, and therefore, with reference to the receive power value and the sending power value of the micro base station, end-to-end transmit power (transmit power between the macro base station and the micro base station) can be obtained, that is, sending power of the macro base station+receive power of the micro base station+sending power of the micro base station. For each micro base station (that is, the second device), according to the transmit power between the micro base station and the macro base station, end-to-end performance (such as throughput and a quantity of supported users) that the micro base station may achieve after the micro base station is selected is calculated, and performance that a system may achieve after the micro base station is selected is calculated, transmission energy efficiency between the micro base station and the macro base station is obtained, and a micro base station is used as a backhaul node for transmitting data to a user, where transmission energy efficiency between the micro base station and the macro base station is largest.

In this way, the macro base station may select a relatively appropriate micro base station from multiple micro base stations to perform a second hop. For example, when end-to-end service quality is met, a micro base station is selected as a backhaul base station for performing the second hop, where transmit power between the micro base station and the macro base station is smallest. If all macro base stations in a network can use a similar method to improve a link energy efficiency level, an overall network energy efficiency level can also be improved in a relatively obvious way.

4. The first device configures a radio resource for the second device according to the actual power of the second device, and sends a radio resource configuration message to instruct the second device to transmit data on the corresponding radio resource.

In an uplink transmission process, a base station is responsible for allocating a radio resource to the user equipment. Generally, a base station device allocates an available uplink radio resource to the user equipment according to an amount of data that the user equipment needs to transmit, a transmit power capability, a channel state, and the like. In this resource allocation manner, although a radio resource can be used in a relatively effective way, an actual power consumption status of a terminal device is not considered, and therefore, standby performance of the terminal device cannot be well ensured. For example, it is assumed that two user equipments have same channel states, data transmission demands, and transmit power, but have different power consumption behavior and requirements for standby performance. A conventional base station scheduler cannot obtain actual power of the user equipment, and therefore, the scheduler cannot perform optimization processing on the foregoing standby performance or energy efficiency performance.

In the fourth implementation, the first device may be a base station (including a macro base station and a micro base station), and the second device may be user equipment. The base station sends a power information request message to one or more user equipments to instruct the user equipment to measure actual power of the user equipment. The actual power herein may also be power efficiency information. After measuring the actual power, the user equipment sends the power information reply message to the base station, to report a measurement result, ID information of the user equipment, and the like to the base station. After obtaining power information of the user equipment, the base station performs radio resource allocation with reference to information such as channel state information of the user equipment, service status information, and a service quality requirement, and notifies the user equipment of an allocation result. The user equipment sends data on a specified radio resource according to an instruction of the base station.

According to the power information exchange method provided in this embodiment of the present invention, a first device sends a power information request message to a second device, to instruct the second device to measure actual power. The first device receives a power information reply message that is sent by each second device and that carries the actual power of the second device, and updates current configuration according to the actual power in each power information reply message. In the prior art, power information exchange between the first device and the second device cannot be performed. Power information cannot represent actual power of a base station, and therefore, network optimization cannot be performed based on the power information, and network power consumption cannot be effectively reduced. According to the power information exchange method provided in this application, by means of actual power exchange, the current configuration is updated based on the actual power of the second device, thereby improving network energy efficiency performance.

Embodiment 2

Figure 2:
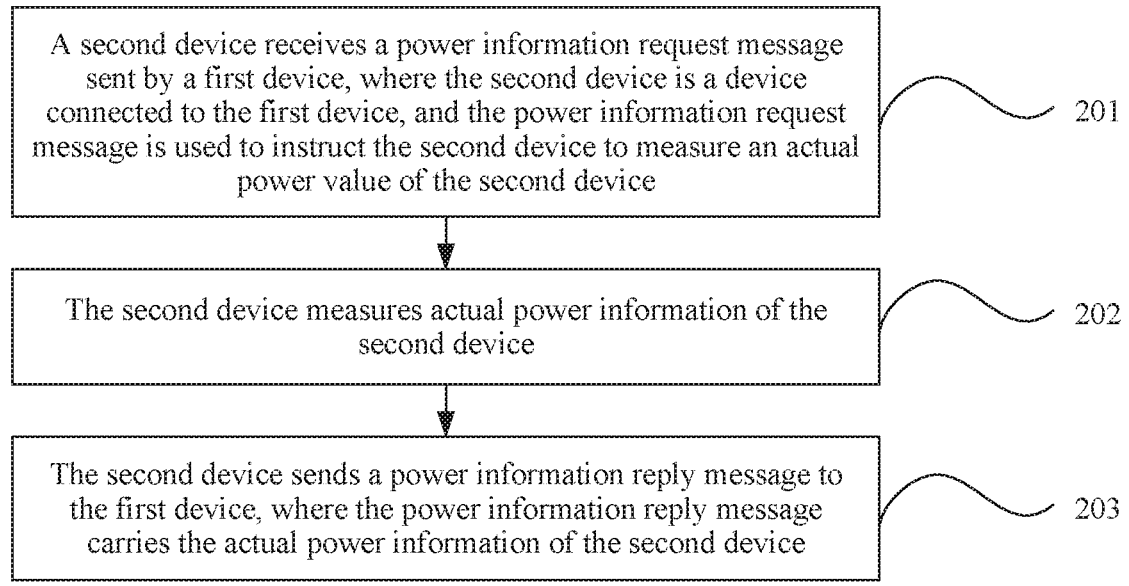
FIG. 2 is a schematic flowchart of a power information exchange method according to Embodiment 2 of the present invention.

This embodiment of the present invention provides a power information exchange method executed by a second device. As shown in FIG. 2, the method includes the following steps.

201. A second device receives a power information request message sent by a first device, where the second device is a device connected to the first device, and the power information request message is used to instruct the second device to measure actual power of the second device.

The first device may be a BS (including a macro base station and a micro base station), an AP, an RRE, an RRH, an RRU, a relay node, or the like. A relationship between the first device and a cell is not limited, that is, one first device may be corresponding to one or more cells, or one cell may be corresponding to one or more first devices. In an embodiment of the present invention, if the first device is a macro base station, the second device is a micro base station. Alternatively, if the first device is a base station (a macro base station or a micro base station), the second device is user equipment connected to the base station. The user equipment may be a mobile phone, a tablet computer, a notebook computer, a personal computer, or the like.

It should be noted that the power request information includes type information of the actual power, format information of the actual power, device information of the first device, and device information of the second device.

202. The second device measures the actual power of the second device.

The actual power is receive power and sending power, or the actual power is a sum of power consumed by all components required by the second device to work.

Figure 3:
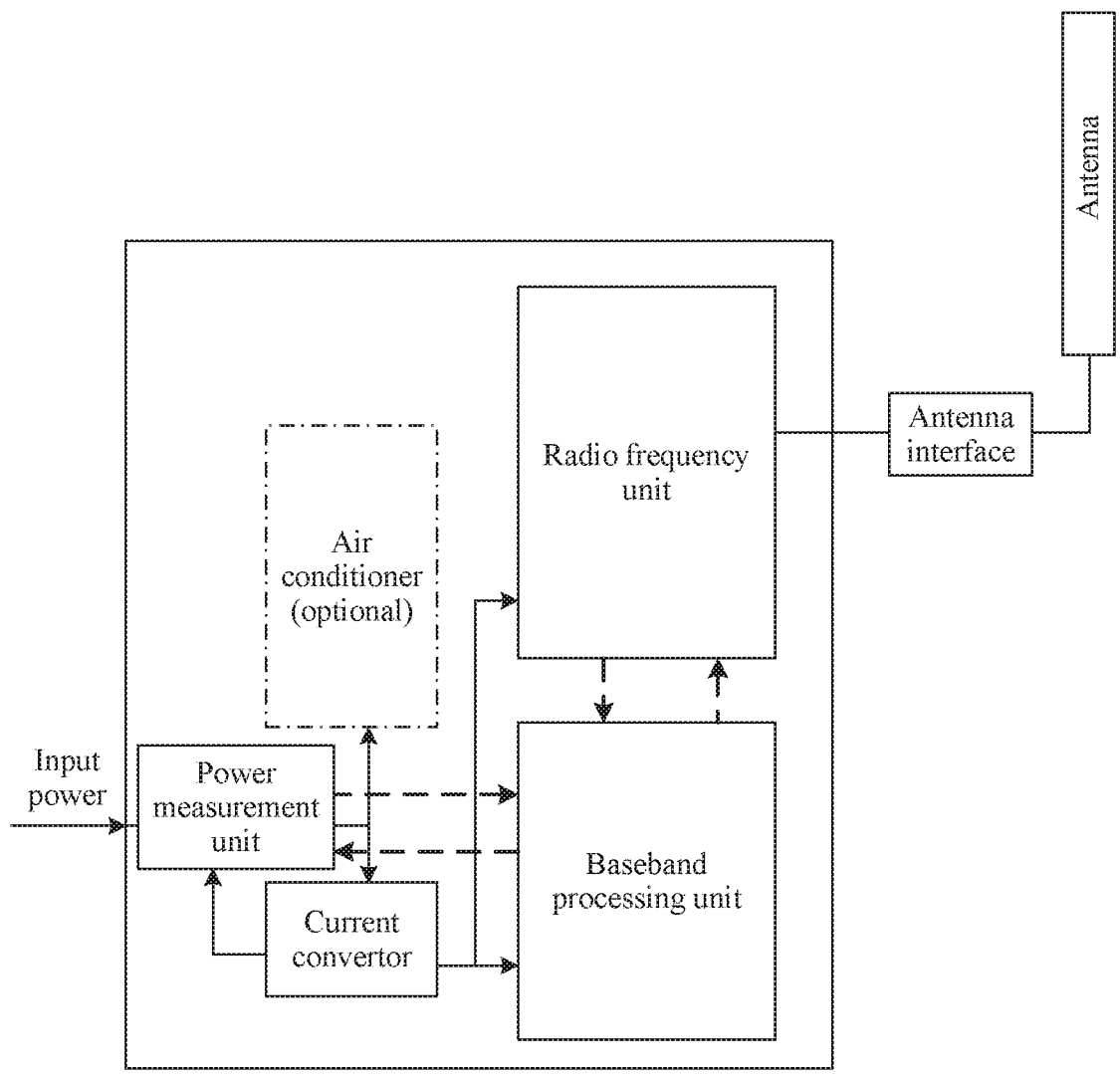
FIG. 3 is a schematic structural diagram of a second device according to Embodiment 2 of the present invention.

FIG. 3 shows a schematic diagram of an internal structure of a second device. In the figure, a solid line arrow indicates a data flow, and a dashed line arrow indicates a power flow. With reference to FIG. 3, a new hardware module needs to be added inside the second device for measuring power information, such as a power measurement unit. If only an overall power level of the second device needs to be measured, the power measurement unit may be deployed at a power supply ingress of a network device. If a power level of a module needs to be measured, such as a radio frequency unit or a baseband processing unit, the power measurement unit needs to be deployed at a power ingress of the module.

203. The second device sends a power information reply message to the first device, where the power information reply message carries the actual power of the second device.

The power reply message is the actual power obtained by the second device by means of measurement after receiving the power information request message sent by the first device. The power information reply message carrying the actual power of the second device is then sent to the first device.

It should be noted that the power information reply message includes a power parameter, the device information of the first device, device information of the second device sending the power information reply message, and the like, and is used to indicate specific power information of the second device.

Specifically, according to content of the power information request message, the power parameter included in the power information reply message may be a power level of the second device, a quantized device power parameter of the second device, or a power parameter of the second device obtained in different quantization manners.

In addition, the device information of the first device is device information of a device needing to obtain power information of the second device.

According to the power information exchange method provided in this embodiment of the present invention, a first device sends a power information request message to a second device, to instruct the second device to measure actual power. The first device receives a power information reply message that is sent by each second device and that carries the actual power of the second device, and updates current configuration according to the actual power in each power information reply message. In the prior art, power information exchange may be performed between the first device and the second device. However, power information cannot represent actual power of a base station, and therefore, network optimization cannot be performed based on the power information, and network power consumption cannot be effectively reduced. According to the power information exchange method provided in this application, by means of actual power exchange, the current configuration is updated based on the actual power of the second device, thereby improving network energy efficiency performance.

Embodiment 3

Figure 4:
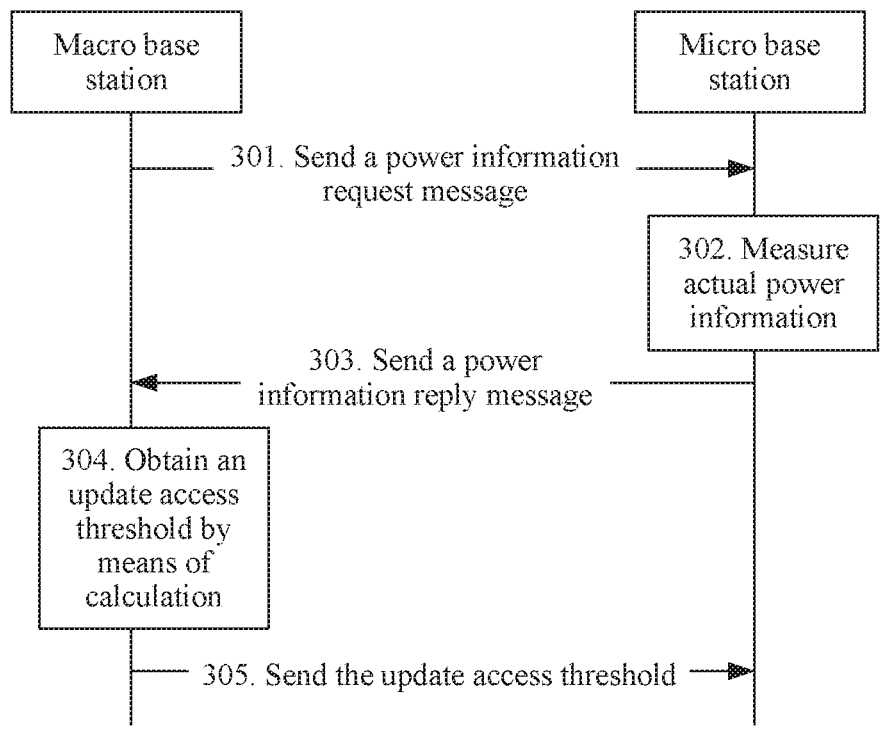
FIG. 4 is a schematic flowchart of a power information exchange method according to Embodiment 3 of the present invention.

This embodiment of the present invention provides a power information exchange method. As shown in FIG. 4, the method includes the following steps.

301. A macro base station sends a power information request message to a micro base station.

The power request information includes type information of the actual power, format information of the actual power, device information of the macro base station, and device information of the micro base station. In this embodiment, the macro base station is a first device of the present invention, and the micro base station is a second device of the present invention.

Each element included in the power request information is specifically described in the following.

1. The type information of the actual power: A type indicated by the type information may be power of the micro base station in different statuses (such as sending power, receive power, or sleep mode power), or may be power of the micro base station in different statistics manners (such as instantaneous power or average power), or may also be power efficiency information of the micro base station (such as an amount of data supported by unit energy, a quantity of connections supported by unit energy, and a quantity of users supported by unit energy).

2. The format information of the actual power: A format indicated by the format information may be quantized according to different value standards (such as absolute quantization or relative quantization), or may be quantized according to different models.

3. The device information of the macro base station is device information of a device initiating a request, or the device information of the macro base station is device information of a device needing to obtain actual power.

302. The micro base station measures actual power.

After the micro base station is powered on, the macro base station sends the power information request message to the micro base station, to obtain the actual power of the micro base station, such as average power information of the micro base station within a recent time period. The micro base station performs measurement and data processing on power information of the micro base station according to the power information request message of the macro base station.

303. The micro base station sends a power information reply message to the macro base station.

The power information reply message carries the actual power obtained by the micro base station by means of measurement in step 302.

304. The macro base station obtains an update access threshold of the micro base station by means of calculation according to the actual power of the micro base station.

In a specific implementation, the macro base station receives the power information reply message sent by each micro base station, and obtains the actual power of the micro base station and actual power of the macro base station according to information carried in the power information reply message, to calculate the update access threshold. The update access threshold is lower than a previous access threshold of the micro base station, so that some user equipments that previously cannot be connected to the micro base station can be connected to the micro base station. Certainly, the macro base station may also calculate access thresholds of multiple micro base stations by using the method provided in this embodiment, to set the access thresholds of the multiple micro base stations.

When excessive users are connected to the macro base station, but fewer users are connected to the micro base station, the macro base station is excessively loaded whereas the micro base station is less loaded, and consequently, an overall network power level is relatively high. If the macro base station wants to connect some users to the micro base station, an access threshold of the micro base station may be reset according to the actual power of the micro base station, so as to transfer some users previously connected to the macro base station to the micro base station. Generally, the actual power consumption (actual power) of the micro base station is far less than that of the macro base station. If the access threshold of the micro base station is inappropriately set, for example, a relatively high access threshold is set, most of users are connected to the macro base station whereas only a few users are connected to the micro base station. Consequently, the macro base station is excessively loaded and has excessive power consumption, and network energy efficiency is reduced. If an actual power difference between the macro base station and the micro base station is considered, the access threshold of the micro base station may be appropriately adjusted, for example, reducing a value of the access threshold, so that more users can be connected to the micro base station. In this way, a load level of the macro base station may be obviously lowered, so that an overall network power level is lowered. Although some users are connected to the micro base station, the micro base station may maintain a relatively good service level by using more radio resources. This increases a load level of the micro base station, but an actual power level of the micro base station is quite low. Therefore, an increase of the load level brings only a quite limited increase of network power, and on the whole, a network energy efficiency level is obviously improved.

305. The macro base station sends the micro base station the update access threshold obtained by means of calculation in step 304.

In this way, the micro base station may set the access threshold to be the update access threshold. The update access threshold is lower than the previous access threshold of the micro base station, so that some user equipments that previously cannot be connected to the micro base station can be connected to the micro base station, and not most of user equipments need to be connected to the macro base station, thereby reducing load pressure of the macro base station, and lowering the overall network power level.

According to the power information exchange method provided in this embodiment of the present invention, a macro base station sends a power information request message to a micro base station, to instruct the micro base station to measure actual power. The macro base station receives a power information reply message that is sent by each micro base station and that carries the actual power of the micro base station, and updates current configuration according to the actual power in each power information reply message. In the prior art, power information exchange may be performed between the macro base station and the micro base station. However, power information cannot represent actual power of a base station, and therefore, network optimization cannot be performed based on the power information, and network power consumption cannot be effectively reduced. According to the power information exchange method provided in this application, by means of actual power exchange, the current configuration is updated based on the actual power of the micro base station, thereby improving network energy efficiency performance.

Embodiment 4

Figure 5:
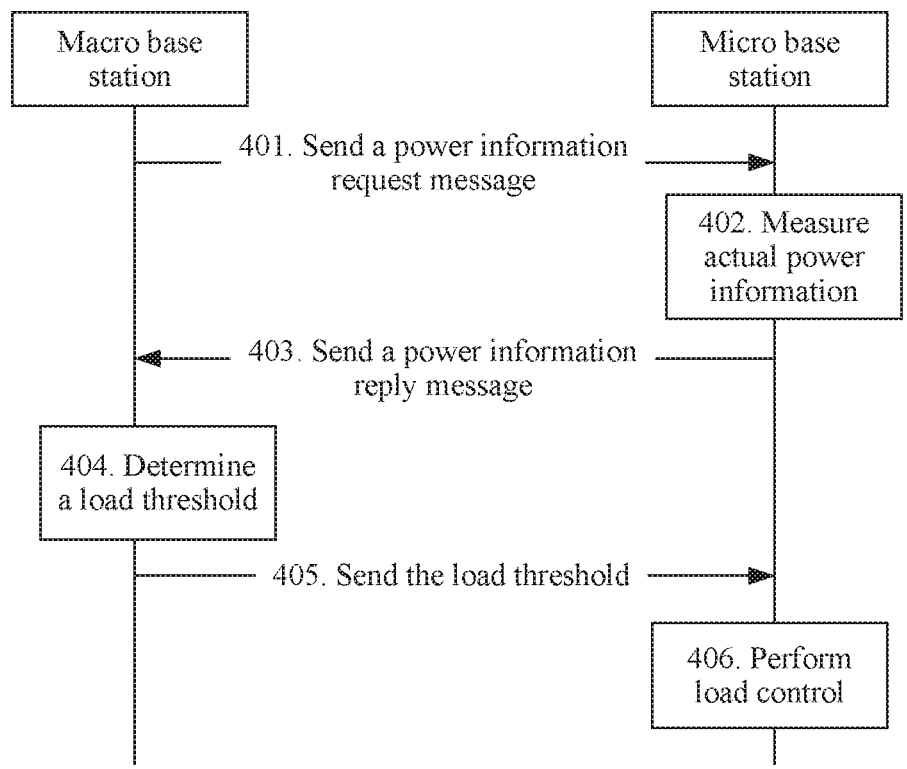
FIG. 5 is a schematic flowchart of a power information exchange method according to Embodiment 4 of the present invention.

This embodiment of the present invention provides a power information exchange method. As shown in FIG. 5, the method includes the following steps.

401. A macro base station sends a power information request message to a micro base station.

The power request information includes type information of the actual power, format information of the actual power, device information of the macro base station, and device information of the micro base station. In this embodiment, the macro base station is a first device of the present invention, and the micro base station is a second device of the present invention.

Each element included in the power request information is specifically described in the following.

1. The type information of the actual power: A type indicated by the type information may be power of the micro base station in different statuses (such as sending power, receive power, or sleep mode power), or may be power of the micro base station in different statistics manners (such as instantaneous power or average power), or may also be power efficiency information of the micro base station (such as an amount of data supported by unit energy, a quantity of connections supported by unit energy, and a quantity of users supported by unit energy).

2. The format information of the actual power: A format indicated by the format information may be quantized according to different value standards (such as absolute quantization or relative quantization), or may be quantized according to different models.

3. The device information of the macro base station is device information of a device initiating a request, or the device information of the macro base station is device information of a device needing to obtain actual power.

402. The micro base station measures actual power.

At a network operation stage, the macro base station may periodically send the power information request message to the micro base station, to control the micro base station to measure and report power information, and obtain the power information of the micro base station by using a power information reply message. By means of information exchange, the macro base station can obtain power information of all micro base stations within a service range of the macro base station, so as to perform load control on different cells by using the information.

Specifically, the micro base station determines the actual power of the micro base station based on a specific power level of the micro base station and a relationship between the power level and a load level (including bandwidth load and power load) of the micro base station. A method is modeling the actual power of the micro base station. For example, $P=f(\lambda_B,\lambda_P)$, where P indicates actual power of the base station, $f(\cdot)$ indicates a function, $\lambda_B$ indicates bandwidth load of the base station (defined as a bandwidth resource actually used by the micro base station divided by a bandwidth resource that the micro base station can use), and $\lambda_P$ indicates power load of the base station (defined as radiated power actually used by the micro base station divided by maximum radiated power of the base station). Herein, modeling should be predefined or be a responsibility of a network controller (such as a network management system). It may be considered that a form of the model is fixed, but a parameter related to the model needs to be exchanged. Therefore, $f(\cdot)$ is used to model a relationship between power and load of the base station, then a model is indicated in the power information request message to be used to quantize the power level, and a corresponding model parameter is carried in the power information reply message. For example, the power level of the base station may be modeled as a load-related linear function, that is, $P=k_B\lambda_B+k_P\lambda_P+P_0$. In this way, relatively stable parameters such as $k_B$, $k_P$, and $P_0$ may be transferred at a time by using the power information reply message, and then, the macro base station periodically sends the power information request message to the micro base station, to trigger the micro base station to transfer $\lambda_B$ and $\lambda_P$ to the macro base station. By receiving the power information reply message, the macro base station can know the actual power (actually consumed power value) and a current power level of the micro base station, thereby adjusting load levels of different base stations by means of load control, so as to reduce network power and improve network energy efficiency while ensuring a service.

403. The micro base station sends a power information reply message to the macro base station.

The power information reply message carries the actual power obtained by the micro base station by means of measurement in step 402. Specifically, in this embodiment, the power information reply message carries a related parameter, so that the macro base station obtains the actual power of the micro base station by means of calculation. Further, the power information reply message may carry a model ID, which is used to notify the macro base station of a model corresponding to the micro base station. Generally, there are multiple model types, and the power information reply message needs to indicate a model that the micro base station uses and a main parameter in the model. For the model $P=k_B\lambda_B+k_P\lambda_P+P_0$, a model ID and load information need to be carried in the reply message.

404. The macro base station determines a load threshold of the micro base station according to the actual power of the micro base station.

In the present invention, actual power (a relationship between actual power and a load level) of a micro base station may be obtained by means of power information exchange between base stations, and then load levels of different base stations may be adjusted by using the relationship, so as to reduce network power by means of appropriate load allocation while service quality is met. For example, load of a micro base station with relatively heavy load may be unloaded to a micro base station whose actual power level is relatively low (that is, actual power is relatively small), or load of a micro base station with relatively heavy load is unloaded to a micro base station whose actual power is less affected by load, so as to maintain or lower network power level, and improve network energy efficiency.

405. The macro base station sends the load threshold determined in step 404 to the micro base station.

In a specific implementation, that load of a micro base station with relatively heavy load may be unloaded to a micro base station whose actual power is relatively low, or load of a micro base station with relatively heavy load is unloaded to a micro base station whose actual power is less affected by load means: The macro base station sends the determined load threshold to the micro base station, so that the micro base station adjusts a load threshold and performs load control.

406. The micro base station performs load control.

In this embodiment, the load control is mainly determined by the macro base station. That is, the macro base station is responsible for collecting the actual power of the micro base station, and then comprehensively considers a user service requirement of the micro base station and a service capability of the micro base station, to determine load levels of different micro base stations. The load level herein may be simply understood as a proportion of bandwidth that can be used by the micro base station for data transmission. For example, after collecting information, the macro base station finds that a quantity of services needing to be transmitted by the macro base station is quite large whereas a load level of the micro base station is relatively low. Therefore, the macro base station may require, by using a load control command, the micro base station to increase load, that is, to unload some services of the macro base station onto the micro base station, so as to reduce overall network power consumption, and improve energy efficiency.

According to the power information exchange method provided in this embodiment of the present invention, a macro base station sends a power information request message to a micro base station, to instruct the micro base station to measure actual power. The macro base station receives a power information reply message that is sent by each micro base station and that carries the actual power of the micro base station, and updates current configuration according to the actual power in each power information reply message. In the prior art, power information exchange may be performed between the macro base station and the micro base station. However, power information cannot represent actual power of a base station, and therefore, network optimization cannot be performed based on the power information, and network power consumption cannot be effectively reduced. According to the power information exchange method provided in this application, by means of actual power exchange, the current configuration is updated based on the actual power of the micro base station, thereby improving network energy efficiency performance.

Embodiment 5

Figure 6:
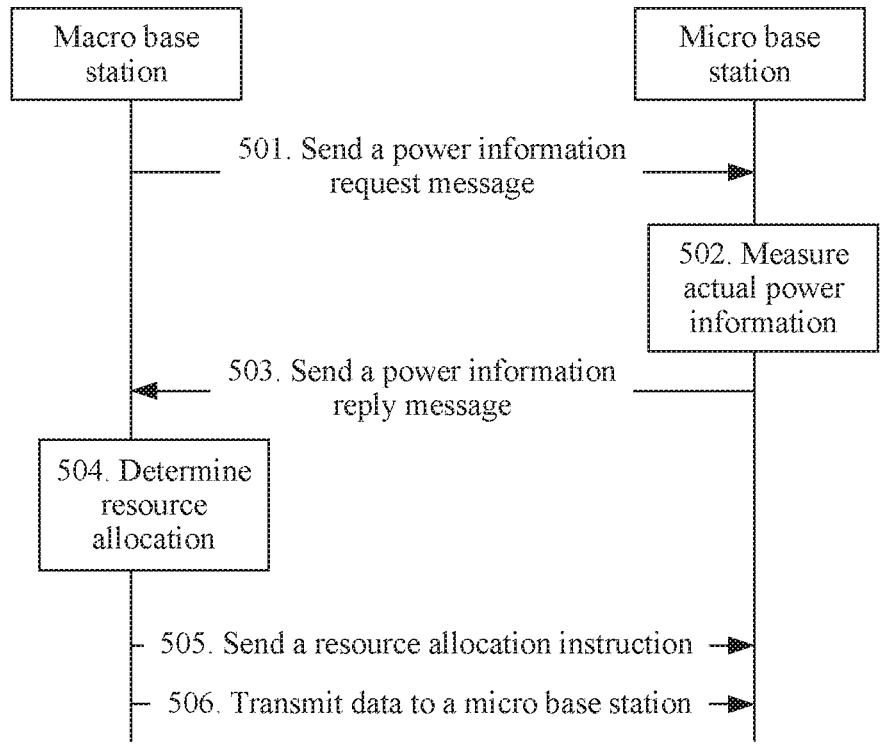
FIG. 6 is a schematic flowchart of a power information exchange method according to Embodiment 5 of the present invention.

This embodiment of the present invention provides a power information exchange method. As shown in FIG. 6, the method includes the following steps.

501. A macro base station sends a power information request message to a micro base station.

In this embodiment, the macro base station is a first device of the present invention, and the micro base station is a second device of the present invention.

The power request information includes type information of the actual power, format information of the actual power, device information of the macro base station, and device information of the micro base station.

Each element included in the power request information is specifically described in the following.

1. The type information of the actual power: A type indicated by the type information may be power of the micro base station in different statuses (such as sending power, receive power, or sleep mode power), or may be power of the micro base station in different statistics manners (such as instantaneous power or average power), or may also be power efficiency information of the micro base station (such as an amount of data supported by unit energy, a quantity of connections supported by unit energy, and a quantity of users supported by unit energy).

2. The format information of the actual power: A format indicated by the format information may be quantized according to different value standards (such as absolute quantization or relative quantization), or may be quantized according to different models.

3. The device information of the macro base station is device information of a device initiating a request, or the device information of the macro base station is device information of a device needing to obtain actual power.

502. The micro base station measures actual power.

When a user is connected to a micro base station for accessing a network resource, and the micro base station is not connected to a core network, the micro base station sends a request to a surrounding macro base station, the macro base station accesses the core network to obtain the resource needed by the user, and sends the resource needed by the user to the micro base station (a first hop), and then the micro base station backhauls the resource to user equipment (a second hop). Network energy efficiency may be improved if the macro base station selects a micro base station as a backhaul node for transmitting the resource to the user equipment, where transmission power between the micro base station and the macro base station is relatively good.

Specifically, the macro base station sends the power information request message to the micro base station, to instruct the micro base station to measure the sending power value and the receive power value, and then the micro base station reports the sending power value and the receive power value of the micro base station by using the power information reply message. The macro base station can obtain a sending power value of the macro base station, and therefore, with reference to the receive power value and the sending power value of the micro base station, total end-to-end transmit power (the transmit power between the macro base station and the micro base station) can be obtained, that is, sending power of the macro base station+receive power of the micro base station+sending power of the micro base station. In this way, the macro base station may select a relatively appropriate micro base station from multiple micro base stations to perform a second hop. For example, a micro base station is selected as a backhaul base station for performing the second hop, where the transmit power between the micro base station and the macro base station is smallest. If all macro base stations in a network can use a similar method to improve a link energy efficiency level, an overall network energy efficiency level can also be improved in a relatively obvious way.

503. The micro base station sends a power information reply message to the macro base station.

The power information reply message carries the actual power obtained by the micro base station by means of measurement in step 502.

504. The macro base station determines resource allocation for the micro base station according to the actual power of the micro base station.

In the present invention, actual power of a micro base station may be obtained by means of power information exchange between base stations, and then by using the actual power, a backhaul base station may be selected and a resource may be allocated, so as to lower an end-to-end transmission power level while end-to-end service quality (between the micro base station and a macro base station) is met. For example, a base station whose receive power level and sending power level are relatively low may be selected as a backhaul node, so as to lower a network power level and improve network energy efficiency.

It should be noted that a premise of step 504 is: The macro base station determines that transmit power between the micro base station and the macro base station is relatively low, and uses the micro base station as a backhaul node for the second hop to transmit data to a user.

505. The macro base station sends a resource allocation instruction to the micro base station.

The resource allocation instruction is used to instruct the micro base station to use a resource for receiving data from the macro base station, and specifically includes a resource location occupied by data of the macro base station and a to-be-used sending manner (such as a transmission mode and a modulation and coding scheme).

506. The macro base station transmits data to the micro base station.

The data in step 506 is data that user equipment needs to access.

According to the power information exchange method provided in this embodiment of the present invention, a macro base station sends a power information request message to a micro base station, to instruct the micro base station to measure actual power. The macro base station receives a power information reply message that is sent by each micro base station and that carries the actual power of the micro base station, and updates current configuration according to the actual power in each power information reply message. In the prior art, power information exchange may be performed between the macro base station and the micro base station. However, power information cannot represent actual power of a base station, and therefore, network optimization cannot be performed based on the power information, and network power consumption cannot be effectively reduced. According to the power information exchange method provided in this application, by means of actual power exchange, the current configuration is updated based on the actual power of the micro base station, thereby improving network energy efficiency performance.

Embodiment 6

Figure 7:
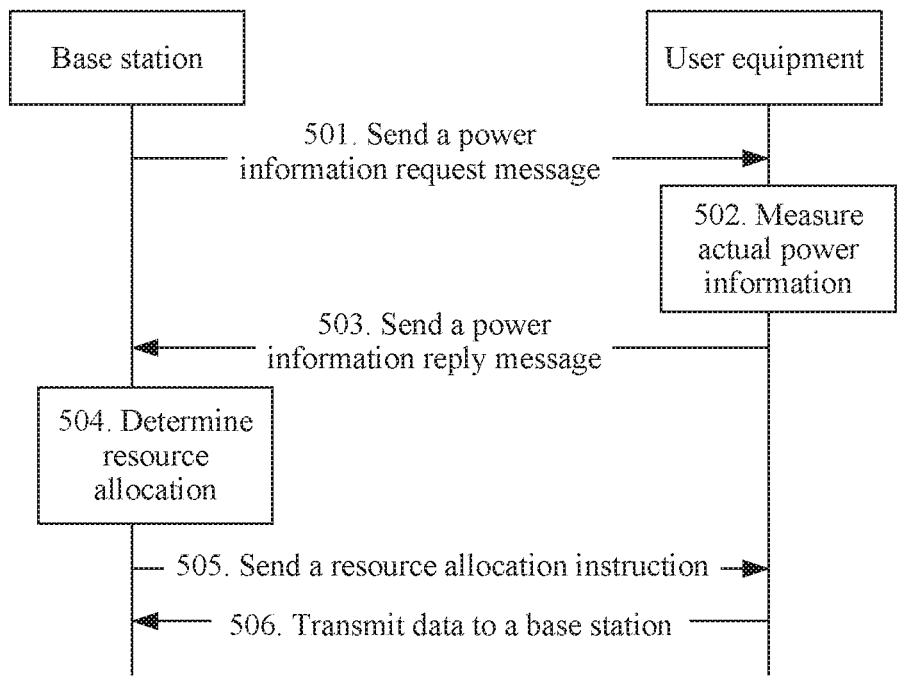
FIG. 7 is a schematic flowchart of a power information exchange method according to Embodiment 6 of the present invention.

This embodiment of the present invention provides a power information exchange method. As shown in FIG. 7, the method includes the following steps.

601. A base station sends a power information request message to user equipment.

In this embodiment, the base station is a first device of the present invention, and the user equipment is a second device of the present invention.

The power request information includes type information of the actual power, format information of the actual power, device information of the base station, and device information of the user equipment.

Each element included in the power request information is specifically described in the following.

1. The type information of the actual power: A type indicated by the type information may be power of the user equipment in different statuses (such as sending power, receive power, or sleep mode power), or may be power of the user equipment in different statistics manners (such as instantaneous power or average power), or may also be power efficiency information of the user equipment (such as an amount of data supported by unit energy, a quantity of connections supported by unit energy, and a quantity of users supported by unit energy).

2. The format information of the actual power: A format indicated by the format information may be quantized according to different value standards (such as absolute quantization or relative quantization), or may be quantized according to different models.

3. The device information of the base station is device information of a device initiating a request, or the device information of the base station is device information of a device needing to obtain actual power.

602. The user equipment measures actual power.

In an uplink transmission process, a base station is responsible for allocating a radio resource to the user equipment. Generally, a base station device allocates an available uplink radio resource to the user equipment according to an amount of data that the user equipment needs to transmit, a transmit power capability, a channel state, and the like. In this resource allocation manner, although a radio resource can be used in a relatively effective way, an actual power consumption status of a terminal device is not considered, and therefore, standby performance of the terminal device cannot be well ensured. For example, it is assumed that two user equipments have same channel states, data transmission demands, and transmit power, but have different power consumption behaviors and requirements for standby performance. A conventional base station scheduler cannot obtain an actual power consumption behavior of the user equipment, and therefore, the scheduler cannot perform optimization processing on the foregoing standby performance or energy efficiency performance.

A solution provided in the present invention is that the base station sends the power information request message to the user equipment to instruct the user equipment to measure actual power of the user equipment. In addition to actual power, the actual power herein may be power efficiency information.

603. The user equipment sends a power information reply message to the base station.

After measuring the actual power, the user equipment sends the power information reply message to the base station, to report a measurement result, ID information of the user equipment, and the like to the base station.

604. The base station determines resource allocation.

After obtaining power information of the user equipment, the base station performs radio resource allocation with reference to information such as channel state information of the user equipment, service status information, and a service quality requirement, and notifies the user equipment of an allocation result.

605. The base station sends a resource allocation instruction to the user equipment.

606. The user equipment sends data to the base station.

The user equipment sends data on a specified radio resource according to an instruction of the base station.

According to the power information exchange method provided in this embodiment of the present invention, a macro base station sends a power information request message to a micro base station, to instruct the micro base station to measure actual power. The macro base station receives a power information reply message that is sent by each micro base station and that carries the actual power of the micro base station, and updates current configuration according to the actual power in each power information reply message. In the prior art, power information exchange is performed between the macro base station and the micro base station. However, power information cannot represent actual power of a base station, and therefore, network optimization cannot be performed based on the power information, and network power consumption cannot be effectively reduced. According to the power information exchange method provided in this application, by means of actual power exchange, the current configuration is updated based on the actual power of the micro base station, thereby improving network energy efficiency performance.

Embodiment 7

Figure 8:
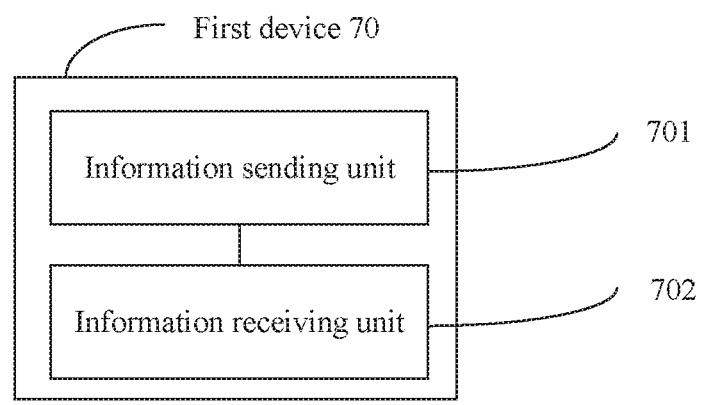
FIG. 8 is a structural block diagram of a first device according to Embodiment 7 of the present invention.

This embodiment of the present invention provides a first device 70. As shown in FIG. 8, the device 70 includes an information sending unit 701 and an information receiving unit 702.

The information sending unit 701 is configured to separately send a power information request message to each second device, where the second device is a device connected to the first device, and the power information request message is used to instruct each second device to measure actual power of the second device.

The information receiving unit 702 is configured to receive a power information reply message sent by each second device, where the power information reply message carries the actual power of the second device sending the power information reply message.

The power request message carries type information of the actual power and format information of the actual power. The first device may be a base station (including a macro base station and a micro base station), an access point AP, an RRE, an RRH, an RRU, a relay node, or the like. A relationship between the first device and a cell is not limited, that is, one first device may be corresponding to one or more cells, or one cell may be corresponding to one or more first devices. In an embodiment of the present invention, if the first device is a macro base station, the second device is a micro base station. Alternatively, if the first device is a base station (a macro base station or a micro base station), the second device is user equipment connected to the base station. The user equipment may be a mobile phone, a tablet computer, a notebook computer, a personal computer, or the like. Actually, the first device herein is a device needing to obtain actual power information of another device so as to perform transmission control.

It should be noted that the power request information includes type information of the actual power, format information of the actual power, device information of the first device, and device information of the second device.

Each element included in the power request information is specifically described in the following.

1. The type information of the actual power: A type indicated by the type information may be power of the second device in different statuses (such as sending power, receive power, or sleep mode power), or may be power of the second device in different statistics manners (such as instantaneous power or average power), or may also be power efficiency information of the second device (such as an amount of data supported by unit energy, a quantity of connections supported by unit energy, and a quantity of users supported by unit energy).

2. The format information of the actual power: A format indicated by the format information may be quantized according to different value standards (such as absolute quantization or relative quantization), or may be quantized according to different models.

3. The device information of the first device is device information of a device initiating a request, or it may be understood that the device information of the first device is device information of a device needing to obtain actual power.

Figure 9:
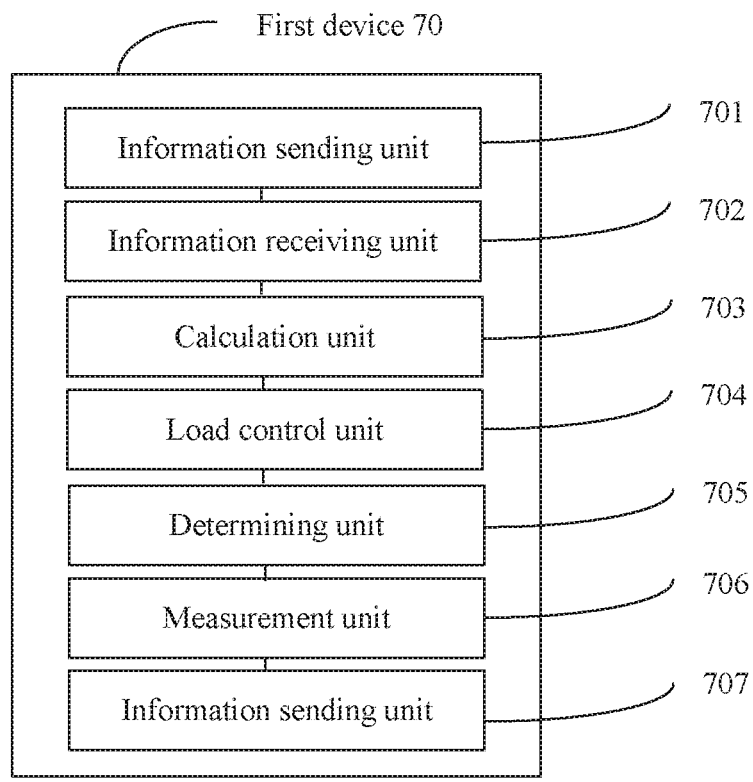
FIG. 9 is another structural block diagram of a first device according to Embodiment 7 of the present invention.

As shown in FIG. 9, the first device 70 further includes a calculation unit 703, a load control unit 704, a determining unit 705, a measurement unit 706, and a configuration unit 707.

The calculation unit 703 is configured to obtain an update access threshold of the second device by means of calculation according to the actual power that is carried in the power information reply message sent by the second device.

The information sending unit 701 is further configured to send the update access threshold to the second device, so that the second device sets an access device of the second device to be in compliance with the update access threshold. The actual power is a sum of power consumed by all components required by the second device to work.

If the power information request message is used to instruct the second device to send the first device a parameter required for determining the actual power of the second device, the information sending unit 701 is further configured to periodically send the power information request message to the second device. The actual power is a sum of power consumed by all components required by the second device to work.

The information receiving unit 702 is further configured to periodically receive the power information reply message sent by the second device, where the power information reply message carries the parameter required for determining the actual power of the second device. The actual power is a sum of power consumed by all components required by the second device to work.

The calculation unit 703 is configured to obtain the actual power of the second device by means of calculation according to the parameter that is required for determining the actual power of the second device and that is carried in the received power information reply message.

The load control unit 704 is configured to transfer load of a second device whose actual power is greater than a preset value onto a second device whose actual power is less than the preset value.

The calculation unit 703 is configured to obtain transmit power between the first device and each second device by means of calculation according to a receive power value and a sending power value of each second device. The actual power is transmit power and receive power.

The calculation unit 703 is further configured to determine transmission energy efficiency between the first device and each second device according to the transmit power between the first device and each second device.

The determining unit 705 is configured to use a second device as a backhaul node for transmitting a resource to a user terminal, where the transmission energy efficiency between the second device and the first device is largest.

The measurement unit 706 is configured to obtain a sending power value of the first device by means of measurement.

The calculation unit 703 is specifically configured to use a sum of the sending power value of the first device, the sending power value of the second device, and the receive power value of the second device as transmit power between the second device and the first device.

The calculation unit 703 is further configured to repeatedly perform the "using a sum of the sending power value of the first device, the sending power value of the second device, and the receive power value of the second device as transmit power between the second device and the first device", to obtain the transmit power between the first device and each second device.

The configuration unit 707 is configured to: configure a radio resource for the second device according to the actual power of the second device, and send a radio resource configuration message to instruct the second device to transmit data on the corresponding radio resource.

Figure 10:
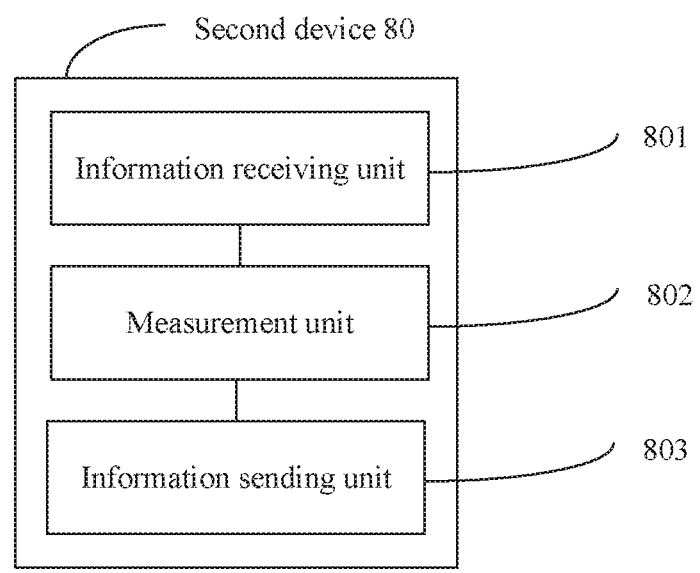
FIG. 10 is a structural block diagram of a second device according to Embodiment 7 of the present invention.

This embodiment further provides a second device, and the second device is a device connected to the first device. As shown in FIG. 10, the second device 80 includes an information receiving unit 801, a measurement unit 802, and an information sending unit 803.

The information receiving unit 801 is configured to receive a power information request message sent by the first device, where the power information request message is used to instruct the second device to measure actual power of the second device.

The measurement unit 802 is configured to measure the actual power of the second device.

The information sending unit 803 is configured to send a power information reply message to the first device, where the power information reply message carries the actual power of the second device.

It should be noted that the power request information includes type information of the actual power, format information of the actual power, device information of the second device, and device information of the first device.

In addition, the actual power may be receive power and sending power, or the actual power is a sum of power consumed by all components required by the second device to work. When the first device sends the power information request message to instruct the second device to measure the actual power of the second device, the processor 1001 needs to measure the receive power and the sending power of the second device, and sends the obtained receive power and sending power of the second device to the first device by using a communications interface 1003.

If the power information request message is used to instruct the second device to send the first device a parameter required for determining the actual power of the second device, the information receiving unit 801 is further configured to periodically receive the power information request message sent by the first device.

The information sending unit 802 is further configured to periodically send the power information reply message to the first device, where the power information reply message carries the parameter required for determining the actual power of the second device.

According to the device provided in this embodiment of the present invention, a macro base station sends a power information request message to a micro base station, to instruct the micro base station to measure actual power. The macro base station receives a power information reply message that is sent by each micro base station and that carries the actual power of the micro base station, and updates current configuration according to the actual power in each power information reply message. In the prior art, power information exchange is performed between the macro base station and the micro base station. However, power information cannot represent actual power of a base station, and therefore, network optimization cannot be performed based on the power information, and network power consumption cannot be effectively reduced. According to the device provided in this application, by means of actual power exchange, the current configuration is updated based on the actual power of the micro base station, thereby improving network energy efficiency performance.

Embodiment 8

Figure 11:
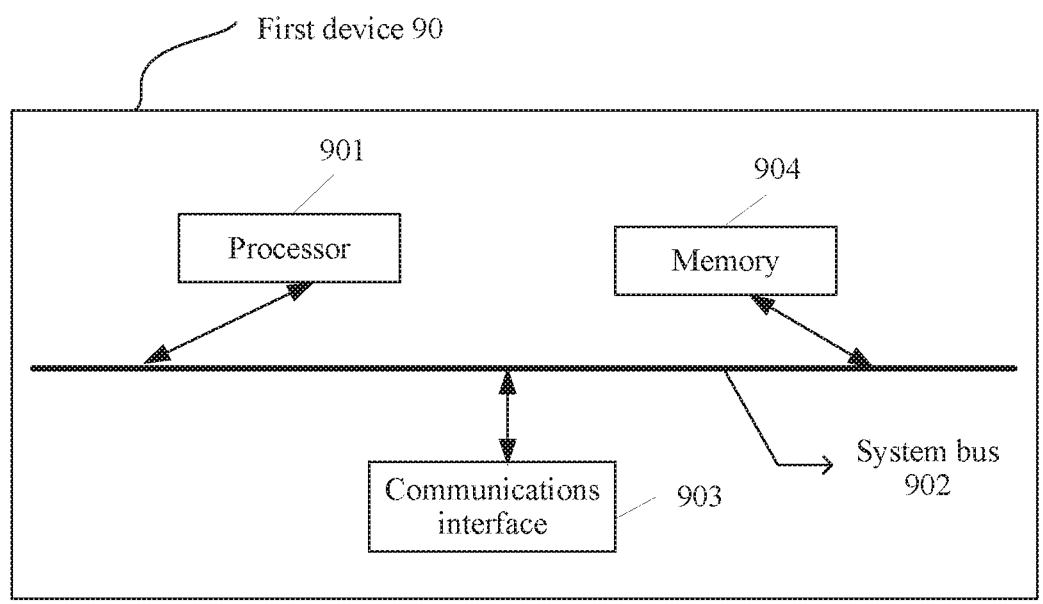
FIG. 11 is a structural block diagram of a first device according to Embodiment 8 of the present invention.

As shown in FIG. 11, this embodiment of the present invention provides a first device 90, and the first device 90 may include a processor 901, a system bus 902, a communications interface 903, and a memory 904.

The processor 901 may be a central processing unit (central processing unit, CPU).

The memory 904 is configured to: store program code, and transmit the program code to the processor 901. The processor 901 executes the following instructions according to the program code. The memory 904 may include a volatile memory (volatile memory), such as a random-access memory (random-access memory, RAM); or the memory 904 may include a non-volatile memory (non-volatile memory), such as a read-only memory (read-only memory, ROM), a flash memory (flash memory), a hard disk drive (hard disk drive, HDD), or a solid state disk (solid-state disk, SSD). The memory 904 may further include a combination of the foregoing types of memories. The processor 901, the memory 904, and the communications interface 903 are connected to each other and communicate with each other by using the system bus 902.

The communications interface 903 may be implemented by an optical transceiver, an electrical transceiver, a wireless transceiver, or any combination thereof. For example, the optical transceiver may be a small form-factor pluggable (small form-factor pluggable transceiver, SFP) transceiver (transceiver), an enhanced small form-factor pluggable (enhanced small form-factor pluggable, SFP+ for short) transceiver, or a 10 Gigabit small form-factor pluggable (10 Gigabit small form-factor pluggable, XFP for short) transceiver. The electrical transceiver may be an Ethernet (Ethernet) network interface controller (network interface controller, NIC). The wireless transceiver may be a wireless network interface controller (wireless network interface controller, WNIC). The first device may have multiple communications interfaces 903.

The processor 901 is configured to separately send a power information request message to each second device by using the communications interface 903, where the second device is a device connected to the first device, and the power information request message is used to instruct each second device to measure actual power of the second device.

The processor 901 is further configured to receive, by using the communications interface, a power information reply message sent by each second device, where the power information reply message carries the actual power of the second device sending the power information reply message.

The power request message carries type information of the actual power and format information of the actual power. The first device may be a base station (including a macro base station and a micro base station), an access point AP, an RRE, an RRH, an RRU, a relay node, or the like. A relationship between the first device and a cell is not limited, that is, one first device may be corresponding to one or more cells, or one cell may be corresponding to one or more first devices. In an embodiment of the present invention, if the first device is a macro base station, the second device is a micro base station. Alternatively, if the first device is a base station (a macro base station or a micro base station), the second device is user equipment connected to the base station. The user equipment may be a mobile phone, a tablet computer, a notebook computer, a personal computer, or the like. Actually, the first device herein is a device needing to obtain actual power information of another device so as to perform transmission control.

It should be noted that the power request information includes type information of the actual power, format information of the actual power, device information of the first device, and device information of the second device.

Each element included in the power request information is specifically described in the following.

1. The type information of the actual power: A type indicated by the type information may be power of the second device in different statuses (such as sending power, receive power, or sleep mode power), or may be power of the second device in different statistics manners (such as instantaneous power or average power), or may also be power efficiency information of the second device (such as an amount of data supported by unit energy, a quantity of connections supported by unit energy, and a quantity of users supported by unit energy).

2. The format information of the actual power: A format indicated by the format information may be quantized according to different value standards (such as absolute quantization or relative quantization), or may be quantized according to different models.

3. The device information of the first device is device information of a device initiating a request, or it may be understood that the device information of the first device is device information of a device needing to obtain actual power.

The power request information includes type information of the actual power, format information of the actual power, device information of the first device, and device information of the second device.

The processor 901 is configured to obtain an update access threshold of the second device by means of calculation according to the actual power that is carried in the power information reply message sent by the second device. The actual power is a sum of power consumed by all components required by the second device to work.

The processor 901 is further configured to send the update access threshold to the second device by using the communications interface, so that the second device sets an access device of the second device to be in compliance with the update access threshold.

If the power information request message is used to instruct the second device to send the first device a parameter required for determining the actual power of the second device, the processor 901 is further configured to periodically send the power information request message to the second device by using the communications interface 903.

The processor 901 is further configured to periodically receive, by using the communications interface 903, the power information reply message sent by the second device, where the power information reply message carries the parameter required for determining the actual power of the second device.

The processor 901 is configured to obtain the actual power of the second device by means of calculation according to the parameter that is required for determining the actual power of the second device and that is carried in the received power information reply message. The actual power is a sum of power consumed by all components required by the second device to work.

The processor 901 is configured to transfer load of a second device whose actual power is greater than a preset value onto a second device whose actual power is less than the preset value.

The processor 901 is further configured to: obtain transmit power between the first device and each second device by means of calculation according to a receive power value and a sending power value of each second device; determine transmission energy efficiency between the first device and each second device according to the transmit power between the first device and each second device; and use a second device as a backhaul node for transmitting a resource to a user terminal, where the transmission energy efficiency between the second device and the first device is largest. The actual power is transmit power and receive power of the second device.

The processor is configured to: obtain a sending power value of the first device by means of measurement; use a sum of the sending power value of the first device, the sending power value of the second device, and the receive power value of the second device as transmit power between the second device and the first device; and repeatedly perform the "using a sum of the sending power value of the first device, the sending power value of the second device, and the receive power value of the second device as transmit power between the second device and the first device", to obtain the transmit power between the first device and each second device.

The processor 901 is configured to: configure a radio resource for the second device according to the actual power of the second device, and send, by using the communications interface 903, a radio resource configuration message to instruct the second device to transmit data on the corresponding radio resource.

Figure 12:
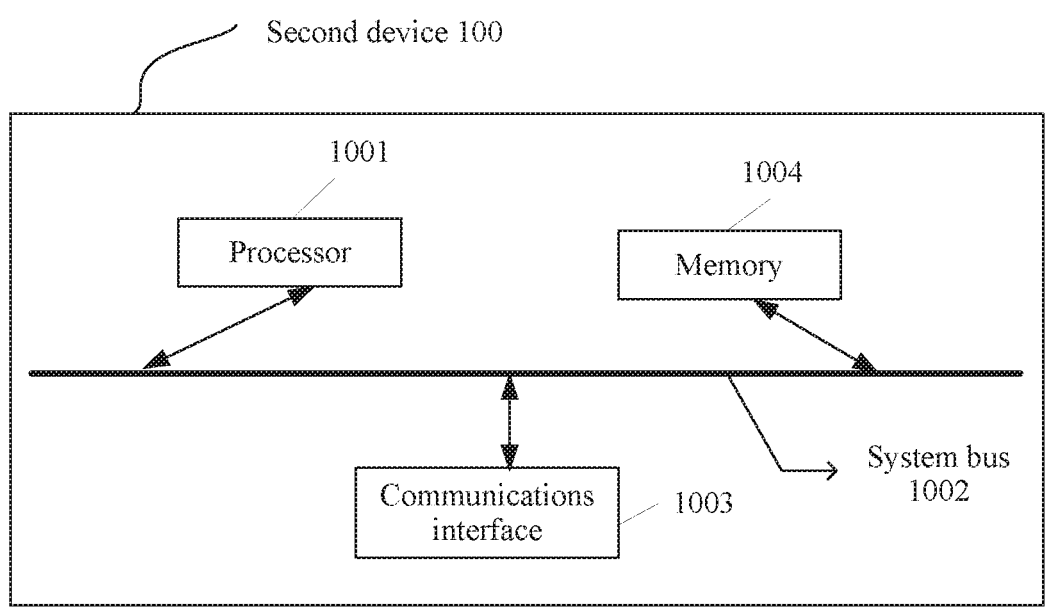
FIG. 12 is a structural block diagram of a second device according to Embodiment 8 of the present invention.

This embodiment further provides a second device 100. As shown in FIG. 12, the second device 100 may include a processor 1001, a system bus 1002, a communications interface 1003, and a memory 1004.

The processor 1001 may be a central processing unit (CPU).

The memory 1004 is configured to: store program code, and transmit the program code to the processor 1001. The processor 1001 executes the following instructions according to the program code. The memory 1004 may include a volatile memory, such as a random-access memory (RAM); or the memory 1004 may include a non-volatile memory, such as a read-only memory (ROM), a flash memory, a hard disk drive (HDD), or a solid state disk (SSD). The memory 1004 may further include a combination of the foregoing types of memories. The processor 1001, the memory 1004, and the communications interface 1003 are connected to each other and communicate with each other by using the system bus 1002.

The communications interface 1003 may be implemented by an optical transceiver, an electrical transceiver, a wireless transceiver, or any combination thereof. For example, the optical transceiver may be a small form-factor pluggable (SFP) transceiver, an enhanced small form-factor pluggable (SFP+ for short) transceiver, or a 10 Gigabit small form-factor pluggable (XFP for short) transceiver. The electrical transceiver may be an Ethernet network interface controller (NIC). The wireless transceiver may be a wireless network interface controller (WNIC). The second device may have multiple communications interfaces 1003.

The processor 1001 is configured to receive, by using the communications interface 1003, the power information request message sent by the first device, where the power information request message is used to instruct the second device to measure actual power of the second device.

The processor 1001 is further configured to measure the actual power of the second device.

The processor 1001 is further configured to send the power information reply message to the first device by using the communications interface 1003, where the power information reply message carries the actual power of the second device.

The power request information includes type information of the actual power, format information of the actual power, device information of the second device, and device information of the first device.

It should be noted that the actual power may further be receive power and sending power, or the actual power is a sum of power consumed by all components required by the second device to work. When the first device sends the power information request message to instruct the second device to measure the actual power of the second device, the processor 1001 needs to measure the receive power and the sending power of the second device, and sends the obtained receive power and sending power of the second device to the first device by using the communications interface 1003.

If the power information request message is used to instruct the second device to send the first device a parameter required for determining the actual power of the second device, the processor 1001 is further configured to: periodically receive, by using the communications interface 1003, the power information request message sent by the first device, and periodically send the power information reply message to the first device by using the communications interface 1003, where the power information reply message carries the parameter required for determining the actual power of the second device.

According to the device provided in this embodiment of the present invention, a macro base station sends a power information request message to a micro base station, to instruct the micro base station to measure actual power. The macro base station receives a power information reply message that is sent by each micro base station and that carries the actual power of the micro base station, and updates current configuration according to the actual power in each power information reply message. In the prior art, power information exchange is performed between the macro base station and the micro base station. However, power information cannot represent actual power of a base station, and therefore, network optimization cannot be performed based on the power information, and network power consumption cannot be effectively reduced. According to the device provided in this application, by means of actual power exchange, the current configuration is updated based on the actual power of the micro base station, thereby improving network energy efficiency performance.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method of power information exchange, comprising:
   sending, by a first device, a power information request message to each second device, wherein the second device is a device connected to the first device, and the power information request message is used to instruct each second device to measure actual power of the second device; and
   receiving, by the first device, a power information reply message from each second device, wherein the power information reply message carries the actual power of the second device sending the power information reply message, and
   the power information request message carries type information of the actual power and format information of the actual power.

2. The method according to claim 1, wherein the actual power is a sum of power consumed by all components required by the second device to work, and the method further comprises:
   obtaining, by the first device, an update access threshold of the second device by calculation according to the actual power that is carried in the power information reply message sent by the second device; and
   sending the update access threshold to the second device, so that the second device sets an access device of the second device to be in compliance with the update access threshold.

3. The method according to claim 1, wherein the actual power is a sum of power consumed by all components required by the second device to work, and the method further comprises:
   transferring, by the first device, load of a second device whose actual power is greater than a preset value onto a second device whose actual power is less than the preset value.

4. The method according to claim 1, wherein when the actual power is sending power and receive power, the method further comprises:
   obtaining, by the first device, transmit power between the first device and each second device by calculation according to a receive power value and a sending power value of each second device;
   determining transmission energy efficiency between the first device and each second device according to the transmit power between the first device and each second device; and
   using, by the first device, a second device as a backhaul node for transmitting a resource to a user terminal, wherein the transmission energy efficiency between the second device and the first device is largest.

5. The method according to claim 4, wherein the obtaining, by the first device, transmit power between the first device and each second device by calculation according to a receive power value and a sending power value of each second device comprises:
   a. obtaining, by the first device, a sending power value of the first device by measurement, and using a sum of the sending power value of the first device, the sending power value of the second device, and the receive power value of the second device as transmit power between the second device and the first device; and
   b. performing the foregoing operation a on each second device, to obtain the transmit power between the first device and each second device.

6. The method according to claim 1, wherein the actual power is a sum of power consumed by all components required by the second device to work, and the method further comprises:
   configuring, by the first device, a radio resource for the second device according to the actual power of the second device, and sending a radio resource configuration message to instruct the second device to transmit data on the corresponding radio resource.

7. A method of power information exchange comprising:
   receiving, by a second device, a power information request message sent by a first device, wherein the second device is a device connected to the first device, and the power information request message is used to instruct the second device to measure actual power of the second device;
   measuring, by the second device, the actual power of the second device; and
   sending, by the second device, a power information reply message to the first device, wherein the power information reply message carries the actual power of the second device, wherein the power information request message comprises type information of the actual power, format information of the actual power, device information of the second device, and device information of the first device.

8. The method according to claim 7, wherein the actual power is receive power and sending power, or the actual power is a sum of power consumed by all components required by the second device to work.

9. A first device, comprising:
   a processor to execute instructions to configure the first device to:
   send a power information request message to each second device, wherein the second device is a device connected to the first device, and the power information request message is used to instruct each second device to measure actual power of the second device; and
   to receive a power information reply message sent by each second device, wherein the power information reply message carries the actual power of the second device sending the power information reply message, and
   the power information request message carries type information of the actual power and format information of the actual power.

10. The first device according to claim 9, wherein the actual power is a sum of power consumed by all components required by the second device to work, and the processor further executes the instructions to configure the first device to:
    obtain an update access threshold of the second device by calculation according to the actual power that is carried in the power information reply message from the second device; and
    send the update access threshold to the second device, so that the second device sets an access device of the second device to be in compliance with the update access threshold.

11. The first device according to claim 9, wherein the actual power is a sum of power consumed by all components required by the second device to work, and when the power information request message is used to instruct the second device to send the first device a parameter required for determining the actual power of the second device, the processor further executes the instructions to configure the first device to:
    periodically send the power information request message to the second device;
    periodically receive the power information reply message sent by the second device, wherein the power information reply message carries the parameter required for determining the actual power of the second device; and
    obtain the actual power of the second device by calculation according to the parameter that is required for determining the actual power of the second device and that is carried in the received power information reply message.

12. The first device according to claim 9, wherein the actual power is a sum of power consumed by all components required by the second device to work, the processor further executes the instructions to configure the first device
    to transfer load of a second device whose actual power is greater than a preset value onto a second device whose actual power is less than the preset value.

13. The first device according to claim 9, wherein when the actual power is sending power and receive power, the processor further executes the instructions to configure the first device
    to obtain transmit power between the first device and each second device by calculation according to a receive power value and a sending power value of each second device;
    determine transmission energy efficiency between the first device and each second device according to the transmit power between the first device and each second device; and use a second device as a backhaul node for transmitting a resource to a user terminal, wherein the transmission energy efficiency between the second device and the first device is largest.

14. The first device according to claim 13, wherein the processor further executes the instructions to configure the first device to:
obtain a sending power value of the first device by measurement;
use a sum of the sending power value of the first device, the sending power value of the second device, and the receive power value of the second device as transmit power between the second device and the first device; and
repeatedly perform the "using a sum of the sending power value of the first device, the sending power value of the second device, and the receive power value of the second device as transmit power between the second device and the first device", to obtain the transmit power between the first device and each second device.

15. The first device according to claim 9, wherein the actual power is a sum of power consumed by all components required by the second device to work, and the processor further executes the instructions to configure the first device to:
configure a radio resource for the second device according to the actual power of the second device, and
send a radio resource configuration message to instruct the second device to transmit data on the corresponding radio resource.

16. A second device connected to a first device and comprising:
a processor to execute an instruction to configure the second device to:
receive a power information request message sent by the first device, wherein the power information request message is used to instruct the second device to measure actual power of the second device;
measure the actual power of the second device; and
send a power information reply message to the first device, wherein the power information reply message carries the actual power of the second device, wherein the power information request message comprises type information of the actual power, format information of the actual power, device information of the second device, and device information of the first device.

17. The second device according to claim 16, wherein the actual power is receive power and sending power, or the actual power is a sum of power consumed by all components required by the second device to work.

18. A second device connected to a first device and comprising:
a processor to execute an instruction to configure the second device to:
receive a power information request message sent by the first device, wherein the power information request message is used to instruct the second device to measure actual power of the second device;
measure the actual power of the second device; and
send a power information reply message to the first device, wherein the power information reply message carries the actual power of the second device, wherein when the power information request message is used to instruct the second device to send the first device a parameter required for determining the actual power of the second device,
the processor further executes the instructions to configure the second device to:
periodically receive the power information request message sent by the first device; and
periodically send the power information reply message to the first device, wherein the power information reply message carries the parameter required for determining the actual power of the second device.

* * * * *